United States Patent [19]
Geier et al.

[11] 3,969,834
[45] July 20, 1976

[54] AIRLIFT

[76] Inventors: Viktor Georgievich Geier, bulvar Pushkina, 33, kv. 3; Vladimir Ivanovich Gruba, bulvar Pushkina, 12, kv. 27; Nikolai Grigorievich Logvinov, Komsomolsky prospekt 25/111, kv. 34; Evgeny Vasilievich Uskov, ulitsa Artema, 58, kv. 35; Viktor Semenovich Kostanda, ulitsa Gornovaya 18, kv. 1; Vladimir Georgievich Mirgorodsky, prospekt Metallurgov, 25, kv. 1, all of Donetsk, U.S.S.R.

[22] Filed: June 20, 1975

[21] Appl. No.: 588,954

Related U.S. Application Data

[63] Continuation of Ser. No. 387,129, Aug. 9, 1973, abandoned.

[52] U.S. Cl. .................................. 37/58; 302/58
[51] Int. Cl.² ........................................ E02F 3/88
[58] Field of Search .......................... 302/14–16, 302/58; 37/58, 61, 62; 417/54, 108

[56] References Cited
UNITED STATES PATENTS

| 469,175 | 2/1892 | Schutte et al. | 302/58 |
| 821,670 | 5/1906 | Parker | 37/61 |
| 1,042,189 | 10/1912 | Beduwe | 302/14 |
| 1,653,027 | 12/1927 | Ward | 37/61 |
| 1,908,220 | 5/1933 | Chapman | 302/15 |
| 1,918,330 | 7/1933 | Green | 302/58 |
| 2,438,258 | 3/1948 | Stokes | 302/15 |
| 2,711,598 | 6/1955 | Craggs | 302/15 |
| 2,774,569 | 12/1956 | Jacobsen | 37/63 |
| 3,301,606 | 1/1967 | Bruno | 302/58 |
| 3,765,727 | 10/1973 | Santangelo et al. | 302/14 |

*Primary Examiner*—Evon C. Blunk
*Assistant Examiner*—Jeffrey V. Nase
*Attorney, Agent, or Firm*—Haseltine, Lake & Waters

[57] ABSTRACT

An airlift for lifting liquids and pulps, comprising a suction unit for sucking in a mass being transported, an air duct for the supply of compressed air and a mixer for mixing compressed air with the mass being transported. The mixer is in communication, via a pipeline, with the suction unit and the air duct. Transfer of the mass being transported from the mixer to an air separator is effected with the aid of another pipeline provided in the airlift. The mixer is rigidly fixed to this pipeline and the air duct. The air duct and the pipeline for lifting the mass being transported have vertical portions, each consisting of at least two pipes fitted one into the other and capable of vertical movement relative to each other. The air duct and the pipeline are communicated with a lifting gear for transfer of the lower pipes of the air duct and the pipeline in the vertical direction together with the suction unit and the mixer.

1 Claim, 1 Drawing Figure

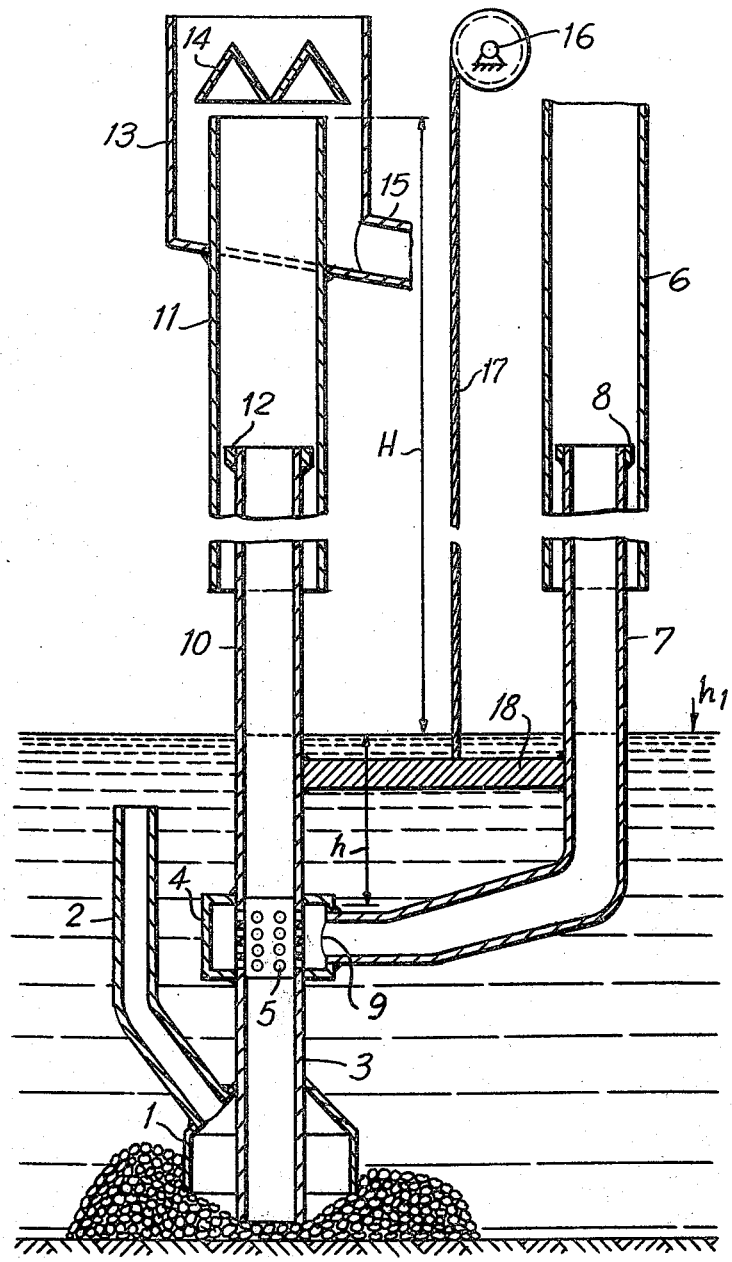

AIRLIFT

This is a Continuing Application of Applicants' patent application Ser. No. 387,129, filed on Aug. 9, 1973, for an Airlift, now abandoned.

The present invention relates to means for lifting pulps, suspensions and corrosive, toxic and other liquids and media, and particularly to an airlift.

The invention may find application in mining, oil and power industries, in extracting minerals from the bottom of seas and rivers, and in pisciculture. It is especially advantageous as a hydraulic lift in hydraulic extraction of minerals.

Known is an airlift comprising a suction unit for sucking in a mass being transported, an air duct for the supply of compressed air and a mixer for mixing said compressed air with the mass being transported. The mixer is in communication, via a pipeline, with the suction unit and the air duct. In order to transfer the mass being transported from the mixer to an air separator, the airlift is provided with a pipeline. The mixer is rigidly fixed to this pipeline and to the air duct.

The above airlift, however has a disadvantage: when it is used as a hydraulic lift, outsize lumps of a solid substance (more than one-third of the diameter of the suction pipe) getting into the suction unit and a decrease in the efficiency of the airlift due to a decrease in the depth of immersion of the mixer or a decrease in the flow rate of compressed air in emergency situations lead to obstructions in the suction unit and prevent further operation of the airlift.

In the known airlift, all the structural elements, including the mixer and the suction unit, have fixed positions in space relative to one another; hence, a resumption of the operation of the airlift following an obstruction of the suction unit is only possible after pumping out a great amount of water and subsequent removal of solid substance, which takes much time (keeping in mind that the suction unit is found under a layer of liquid and solid substance 80 to 90 meters thick).

The operation of the airlift may be resumed by way of lifting the entire airlift, which, however, is a most complicated and arduous operation.

In case of a varied flow rate of a mass being transported into a receiving container mounted at the inlet portion of the airlift, the level of the mass being transported in it and, consequently, the depth of immersion of the mixer are liable to change. Since the maximum level of the mass being transported is determined by the type of compressed air sources used in each particular case and by the resistance of the air duct, fluctuations in the level of the mass being transported are permissible only in one direction, i.e. in the direction of a decrease in the depth of immersion of the mixer, which leads to a lower efficiency of the airlift.

Well known is another airlift, similar to the one described above, which is used for underwater extraction of minerals; in this airlift, accidents of the sea bed or a river bed are overcome by the use of flexible hoses which communicate the mixer with the suction unit.

The use of all kinds of flexible components, however, invariably results in a lower efficiency.

Another disadvantage of this airlift is that all the structural elements thereof, including the mixer and the suction unit, are positioned in space in a fixed manner relative to one another. The result is a lower reliability, poorer performance and more complicated servicing of the airlift.

It is an object of the present invention to cut down the time required to eliminate an obstruction in the suction unit.

It is another object of the present invention to raise the efficiency of the airlift.

In accordance with the above and other objects, the present invention is characterized in that in an airlift for lifting liquids and pulps, comprising a suction unit for sucking in a mass being transported, a mixer communicated via a pipeline with the suction unit and an air duct for the supply of compressed air and serving the mix said compressed air with the mass being transported, a pipeline designed for lifting the mass being transported from the mixer to an air separator, the mixer being rigidly fixed to this pipeline and the air duct, the air duct and the pipeline for lifting the mass being transported have, according to the invention, vertical portions, each being made up by at least two pipes fitted one into the other and capable of vertical movement relative to each other, and are coupled to a lifting gear for transfer of said pipes of the air duct and the pipeline for lifting the mass being transported together with the suction unit and the mixer.

The advantage of the proposed airlift resides in that it makes it possible to ensure a depth of immersion of the mixer required by the working conditions due to the use of the air duct and the pipeline for lifting the mass being transported that are of a variable length. As a result, in case of an obstruction of the suction unit, the movable part of the airlift (the suction unit, the mixer) is lifted above the layer of a solid material, so that the suction unit gets rid of outsize lumps of the solid material and, after being again immersed, resumes transportation of the solid material. Thus, an obstruction of the suction unit is obviated within a short period of time.

The above structure of the air duct and the pipeline for lifting the mass being transported makes it possible to adjust the position of the suction unit depending upon the bottom relief, so that the proposed airlift may be effectively used for dredging operations in ports, underwater extraction of minerals, loading and unloading operations and removing bulk materials and minerals from all kinds of containers.

An increase in the length of the pipeline for lifting the mass being transported by means of appropriately lowering the mixer makes it possible, under these conditions, to alter the relative immersion of the mixer within a lesser range than it is normally achieved with a constant length of said pipeline and the same fluctuations in the level of the mass being transported. Taking into consideration that the efficiency of the airlift, within a sufficiently broad range of operating conditions, is proportional to the relative immersion, it can be stated that the proposed airlift is more effective, as regards power consumption, than that of the known type.

Other objects and advantages of the present invention will be more fully understood from the following description of an embodiment thereof taken in conjunction with the accompanying drawing.

The invention will be better understood from the following description, when considered with the accompanying drawing, the sole FIGURE of which is an elevational sectional view of an airlift in accordance with the present invention.

An airlift for lifting liquids and pulps comprises a suction unit 1 for sucking in a mass being transported.

Communicating with the suction unit 1 is a feed pipe 2 for the supply of liquid to the suction unit 1 to adjust the consistency of the mass being transported. The suction unit 1 is in communication, via a pipeline 3, with a mixer 4 which serves to mix compressed air with the mass being transported. The length of the pipeline 3 is selected to rule out an ejection of compressed air into the area where a solid material is being sucked in. As can be seen from the FIGURE, the pipeline 3 has a bottom end portion that extends below the open, lower edge of the chamber, that constitutes the suction unit 1.

The mixer 4 comprises a casing with a perforated pipe 5 inside it, which makes for a uniform distribution of compressed air throughout the mass being transported.

In order to supply compressed air to the mixer 4, provision is made for an air duct.

Said air duct is made up by two pipes, 6 and 7. The pipe 6 is of a greater diameter and is arranged vertically. The pipe 7 is of a smaller diameter and is bent below its vertical portion. The pipe 7 is fitted into the pipe 6, both being capable of vertical movement relative to each other. In order to reduce air leakage through the clearance between the pipes 6 and 7, there is a sealing ring 8 at the end of the pipe 7, whose diameter is selected to ensure required mobility of the pipes 6 and 7.

The pipe 7 is rigidly secured to the casing of the mixer 4. In the casing of the mixer 5, there is an opening 9 for the supply of compressed air from the pipe 7 to the mixer 4.

In order to lift the mass being transported from the mixer 4 to an air separator, provision is made for a pipeline which is made up by two vertical pipes 10 and 11 having a different diameter. The pipe 10 is of a smaller diameter and is fitted into the pipe 11 of a greater diameter, both being capable of vertical movement relative to each other.

In order to reduce leakage of air and the mass being transported through the clearance between the pipes 10 and 11, provision is made for a sealing ring 12 at the end of the pipe 10, whose diameter ensures required mobility of the pipes, 10 and 11. The use of other sealings instead of said rings is ruled out due to the elipsoidal section of the pipes, as well as solid particles getting into the clearance between the pipes 10 and 11 and the sealing.

The pipe 10 is rigidly secured to the casing of the mixer 4.

The air separator is designed to separate air from the mass being transported. It comprises a casing 13, a repeller 14 arranged inside the casing 13, and an outlet branch pipe 15 for removal of the mass being transported.

The air duct and the pipeline for lifting the mass being transported are coupled to a lifting gear which ensures vertical movement of the pipe 7 of the air duct and the pipe 10 of said pipeline together with the suction unit 1 and the mixer.

The lifting gear is designed as a winch having a pulley 16 with a cable 17 attached to it. The cable 17 is secured to a frame 18. Rigidly fixed to the frame 18 on one side thereof is the pipe 7 of the air duct and on the other side, the pipe 10 of the pipeline for lifting the mass being transported.

The airlift operates as follows.

Compressed air fed through the pipe 6 of the air duct has a pressure corresponding to a depth of immersion $h$ of the mixer 4 and forces liquid from the pipe 7 via the perforated pipe 5 of the mixer 4 and the pipes 10 and 11; the liquid is driven upwards through the pipes 10 and 11. The pipes 6 and 7 of the air duct ensure a preset flow rate of compressed air, which reduces a hydrostatic head inside the mixer 4. The result is a difference between hydrostatic heads inside and outside the mixer 4, which makes for the movement of the mass being transported, which is a liquid containing a solid substance, from the suction unit 1 via the pipeline 3 to the perforated pipe 5 of the mixer 4. The perforated pipe 5 makes for a uniform distribution of compressed air supplied from the air duct throughout the mass being transported. Driven by the compressed air, the mass being transported is lifted through the pipes 10 and 11 to the casing 13 of the air separator. The repeller 14 changes the direction of the flow of the mass being transported which is mixed with compressed air. As the casing 13 has a substantially large cross-section, the flow velocity of the mass being transported mixed with compressed air becomes lower than that of the mass being transported per se. As a result, phase separation takes place, the compressed air, as being a lighter phase, moves upwards, whereas the mass being transported, which is a mixture of a liquid with a solid substance, is accumulated at the bottom of the casing 13 of the air separator and is removed from it via the outlet branch pipe 15.

As solid substance is being fed from the suction unit 1, the latter is lowered with the aid of the lifting gear to the zone where the solid substance is accumulated.

In cases of obstruction of the suction unit, the movable part of the airlift, comprising the suction unit 1, the feed pipe 2, the mixer 4 and the pipes 3, 7 and 10 is lifted above the solid substance layer with the aid of the lifting gear, the supply of compressed air is cut off, and the solid substance is separated from the suction unit 1. After the movable part of the airlift has been immersed again, the operation proceeds as usual.

In case of a change in the level $h_1$ of the liquid in a receiving container 19, which is due either to suction of the mass being transported from the container 19 or a change in the influx rate of the mass being transported into said container 19, an appropriate change in the position of the frame 18 ensures a required depth $h$ of immersion of the mixer 4.

When using the above airlift for extraction of minerals from the bottom of seas, lakes and rivers, accidents of the bottom relief are overcome by vertical displacement of the frame 18 with the entire movable part of the airlift. The remaining components of the airlift, including the air separator, the lifting gear and the pipes 6 and 11, are mounted aboard a vessel.

The fact that the proposed airlift makes it possible to alter relative immersion of the mixer and, consequently, the efficiency of the airlift following flutuations in the flow rate of a mass being transported within a lesser range, as compared to the known airlift, is corroborated by the following example.

In an airlift with the depth of immersion $h = 70$ m and a hoisting depth $H = 150$ m, relative immersion $\alpha_1$ is described by the function:

$$\alpha_1 = \frac{h}{h+H} = \frac{70}{70+150} = 0.318.$$

With a decrease in the immersion, for example, by 10 m, and the constant length of the pipeline for lifting a mass being transported, relative immersion $\alpha_2$ is reduced to a value:

$$\alpha_2 = \frac{70 - 10}{70 + 150} = 0.273.$$

With a decrease in the level of the mixer by 10 m, i.e. with an increase in the length of said pipeline by 10 m and with the same immersion depth, relative immersion $\alpha_3$ is reduced less substantially and is equal to $$\alpha_3 = \frac{70}{70 + 150 + 10} = 0.305$$

Hence, the efficiency of the airlift is reduced to a lesser extent.

What is claimed is:

1. An airlift for lifting liquids and pulps from the bottoms of seas and rivers, comprising a submerged suction unit for sucking in a mass being transported which is a mixture of a liquid and solids; a mixer rigidly fixed to, communicating with said suction unit, and serving to mix the mass with compressed air; a partly submerged air duct rigidly fixed to said mixer for supplying the compressed air thereto; an air separator for separating the mass from the compressed air; a partly submerged pipeline respectively fixed to both said mixer and said air separator and extending below said mixer and said suction unit, for lifting the mass together with the compressed air from the former to the latter, and having an open end remote from said mixer; said air duct and said pipeline having vertical portions, each being made up by a pair of pipe sections, fitted one into the other for vertical movement relative to each other, and for simultaneously changing the combined lengths of said pipe sections; a lifting gear attached to the lower ones of said pairs of pipe sections for simultaneous vertical movement thereof, for varying the combined length of said air duct and of said pipeline, for lifting said suction unit and said mixer; wherein said suction unit has a chamber open from below and communicating with a submerged feed pipe for supplying the liquid to said chamber from the surrounding sea and river, said pipeline having a bottom end portion extending below the open, lower edge of said chamber; means for causing phase separation in said air separator between the compressed air, that is allowed to move upwards through said open end of the pipeline, and the mass, that accumulates at the bottom of said air separator; and means for discharging the mass from said air separator.

* * * * *